(12) United States Patent
Fujimoto et al.

(10) Patent No.: US 6,591,635 B1
(45) Date of Patent: Jul. 15, 2003

(54) METHOD OF BONDING TUBULATION TUBING OF DISPLAY PANEL

(75) Inventors: Akihiro Fujimoto, Kawasaki (JP); Shinji Kanagu, Kawasaki (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 91 days.

(21) Appl. No.: 09/717,130

(22) Filed: Nov. 22, 2000

(30) Foreign Application Priority Data

Apr. 24, 2000 (JP) ......................... 2000-123268

(51) Int. Cl.⁷ ............................................. C03B 27/00
(52) U.S. Cl. ................................. 65/34; 65/43
(58) Field of Search ........................ 65/34, 43

(56) References Cited

U.S. PATENT DOCUMENTS

| | | | | | |
|---|---|---|---|---|---|
| 3,436,109 | A | * | 4/1969 | Loose | 257/698 |
| 3,914,000 | A | * | 10/1975 | Beckerman et al. | 445/25 |
| 3,966,449 | A | * | 6/1976 | Foster et al. | 501/15 |
| 3,975,176 | A | * | 8/1976 | Salisbury | 65/38 |
| 5,897,927 | A | * | 4/1999 | Tsai et al. | 220/2.2 |
| 6,354,899 | B1 | * | 3/2002 | Moore | 445/25 |

FOREIGN PATENT DOCUMENTS

JP            9-306362         11/1997

OTHER PUBLICATIONS

Machine translation of JP 9–306362, prepared on Aug. 21, 2002 at http://www1.ipdl.jpo.go.jp/PA1/cgi–bin/PA1INDEX.*

* cited by examiner

*Primary Examiner*—Sean Vincent
(74) *Attorney, Agent, or Firm*—Staas & Halsey LLP

(57) ABSTRACT

A method of bonding a tubulation tubing of a display panel includes the steps of preparing a tubulation tubing having a flange at one end and a ring-shape adhesive member, placing the tubulation tubing and the adhesive member on a display panel to align the vent hole with an opening of the tubulation tubing, holding the tubulation tubing by pressing the flange of the tubulation tubing to a face of the display panel with a pressing tool, and heating to soften the adhesive, thereby bonding the flange of the tubulation tubing to the display panel via the adhesive member.

32 Claims, 7 Drawing Sheets

METHOD OF BONDING TUBULATION TUBING OF DISPLAY PANEL

CROSS-REFERENCE TO RELATED APPLICATION

This application is related to Japanese Patent Application No. 2000-123268 filed on Apr. 24, 2000, whose priority is claimed under 35 USC §119, the disclosure of which is incorporated by reference in its entirety.

BACKGROUND OF THE INVENTION

1. Field of the Invention

The present invention relates to a method of bonding a tubulation tubing of a display panel, more particularly, a method of bonding a tubulation tubing to a display panel such as a plasma display panel (PDP) for removing an impurity gas from an electric discharge space in the display panel and introducing an electric discharge gas into the discharge space.

2. Description of Related Art

In a display panel such as a PDP, the discharge space is usually formed in the panel by disposing a front substrate and a back substrate of the panel opposedly and sealing the peripheries of the substrates together. Typically, in the production of the panel, a vent hole is opened in the back substrate and a glass tubulation tubing is bonded to the perimeter of the vent hole when the front and back substrates are sealed together. Via this tubulation tubing, the impurity gas is removed from the inside of the panel and the discharge gas is fed in the panel. Thereafter, the tubulation tubing is cut by fusing (melting) so that a tubulation path in the tubulation tubing is closed, thereby making the discharge space airtight.

In order to bond the tubulation tubing to the back substrate, usually, a glass frit or glass powder is mixed with a binder and formed in a ring shape. This glass material (also referred to as a sealing glass) is preliminarily baked to release gas therefrom and placed between a flare edge of the tubulation tubing and the back substrate. The glass material is fastened provisionally with the tubulation tubing by means of a clip. Thereafter a sealing step is conducted for sealing the front substrate and the back substrate together (by fusing a sealing member with heat), thereby also welding the tubulation tubing to the back substrate with the glass material.

However, since the glass material is between the flare end portion of the tubulation tubing and the back substrate, the glass material, melted, may enter the inside of the tubulation tubing and block the tubulation tubing when the tubulation tubing and the back substrate are bonded by melting the glass material. The melted glass material may also enter the inside of the panel when the impurity gas is vented out and the discharge gas is fed into the panel.

Where the sealing step is carried out after the glass material has been provisionally fastened together with the tubulation tubing by a clip, the glass material softened in the sealing step is pushed out from between the flare end portion of the tubulation tubing and the back substrate and adheres to the clip. As a result, it may become difficult to remove the glass material when the clip is taken off or the glass material may crack when removed.

Further, if the pressing force by the clip for holding the tubulation tubing is too strong, the glass member is pushed out from the flare end portion of the tubulation tubing. For this reason, the pressing force cannot be strengthened above a certain degree. Therefore, when the sealing step is carried out with the glass material being provisionally fastened together with the tubulation tubing by the clip, the tubulation tubing may possibly be inclined when a little force is applied.

SUMMARY OF THE INVENTION

In these circumstances, the present invention is intended to provide a method of bonding a tubulation tubing of a display panel which can prevent the entry of the adhesive member into the tubulation tubing or the adhesion of the adhesive member to the clip, by preparing a tubulation tubing having a flange with a substantially flat end face and an adhesive member to be fitted to the perimeter of the flange of the tubulation tubing, placing the tubulation tubing and the adhesive member at a vent hole of a display panel, and pressing the flange against the display panel with a clip to bond the tubulation tubing to the display panel.

The present invention provides a method of bonding a tubulation tubing of a display panel comprising the steps of: preparing a tubular tubulation tubing having, at one end, a flange with a substantially flat end face and a ring-shape adhesive member to be fitted to the perimeter of the flange of the tubulation tubing; placing the tubulation tubing and the adhesive member on a display panel having a vent hole in such a manner that the end face of the flange of the tubulation tubing contacts the display panel and the vent hole is covered with an opening of the tubulation tubing; and holding the tubulation tubing by pressing the flange of the tubulation tubing to a face of the display panel with use of a pressing tool and heating to a temperature at which the adhesive member softens, thereby bonding the flange of the tubulation tubing to the display panel by fusion of the adhesive member.

According to the present invention, the tubulation tubing having, at one end, the flange with a substantially flat end face and the ring-shape adhesive member to be fitted to the perimeter of the flange of the tubulation tubing are prepared. The tubulation tubing and the adhesive member are placed on the display panel, and the tubulation tubing is held by pressing the flange of the tubulation tubing against the display panel face with a pressing tool. Therefore, the pressing tool does not contact the adhesive member directly, which prevents the adhesive member such as glass from adhering to the pressing tool, for example, a clip.

Further, the tubulation tubing having the adhesive member already fitted to the periphery of the flange is placed on the display panel with the end face of the flange of the tubulation tubing contacting the display panel, and the tubulation tubing is held by pressing the flange of the tubulation tubing against the display panel face with the pressing tool. Therefore, the melted adhesive member does not enter the inside of the tubulation tubing. Also, since the pressing force of the clip can be strengthened, the inclination of the tubulation tubing by external force can be suppressed.

These objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
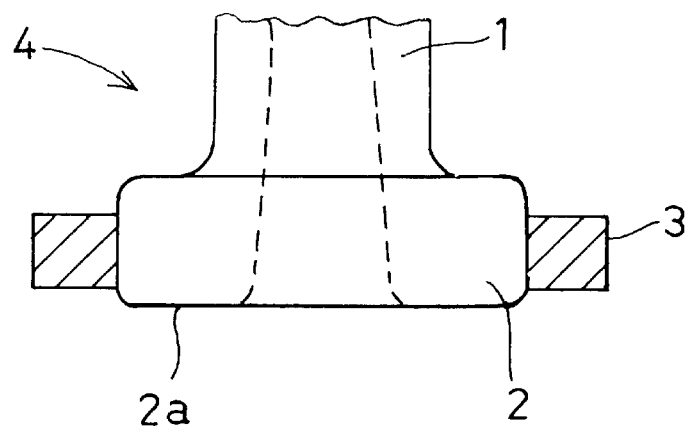
FIG. 1 illustrates Example 1 of the method for bonding a tubulation tubing of a display panel in accordance with the present invention.

The method of bonding a tubulation tubing to a display panel of the present invention can be applied to any kind of panel that has a space inside the panel and requires the removal of a gas from the space and/or the introduction of a gas into the space via a vent hole provided to the panel. As examples of such display panels, PDPs, plasma address liquid crystal (PALC) panels, VFD(Vacuum Fluorescence Display) and FED(Field emission Display) may be mentioned.

In the present invention, a tubular glass pipe known in the field of art may be used as the tubulation tubing. The tubulation tubing is typically a cylindrical pipe. However, it suffices that the tubulation tubing can pass air/gas through, and accordingly the shape of the tubulation tubing does not necessarily need to be cylindrical. As an example of glass material for the tubulation tubing, soda lime glass (typically having a softening point of 500 to 700° C.) may be mentioned. At the opening at the one end of the tubulation tubing, the flange having a substantially flat face is formed. The flange can be produced by a known method. Since the end face of the flange is a face contacting the substrate, it is preferably formed as flat as possible for preventing gas leakage and the like from this contact face.

The adhesive member is a member for bonding the one end of the tubulation tubing to the display panel. The adhesive member may be formed of any material that has a lower softening point than the softening point of the tubulation tubing. Generally, the tubulation tubing is bonded simultaneously when the front and back substrates of the display panel are sealed together. In this sealing step, the display panel is placed in an oven and the temperature in the oven is raised to the softening point of a sealing member provided in the periphery of the substrates. This sealing temperature varies depending on the type of the sealing member, but since a low softening point glass is usually used as the sealing member, the sealing temperature is about 400 to 410° C.

Therefore, the adhesive member is preferably formed of a glass material having a softening point of 400° C. or lower, preferably a softening point of 390 to 400° C. for preventing over-melting of the adhesive member. As an example of such material, a low softening point glass containing PbO—$B_2O_3$ may be mentioned.

For example, as a material for the adhesive member, a low softening point glass frit containing PbO, $SiO_2$, $Al_2O_3$, $B_2O_3$ and LiO which has a softening point of about 390° C. and a thermal expansion coefficient of $72.5\pm5\times10^{-7}/°$ C. may be used, and a binder resin known in the field such as acrylic resin, methacrylic resin, cellulose resin or the like may be added to the low softening point glass frit. This material may be press-molded in a doughnut shape having a substantially rectangular section, and then baked.

In addition to the above-mentioned example, the adhesive member may be a compression-molded glass member of the above-mentioned low softening point glass frit or a molded glass paste member of the above low softening point glass frit blended with the binder resin which is not baked. Even if the molded glass paste, without being baked, is provisionally fixed to the perimeter of the flange of the tubulation tubing and the flange of the tubulation tubing is bonded to the display panel in the sealing step, the molded glass paste is baked simultaneously in the sealing environment. At this time, if gas is generated by the combustion of the binder resin in the case where the molded glass paste member is used, the generated gas does not enter the tubulation tubing from an abutment of the tubulation tubing and the display panel.

The provisional fixation of the adhesive member to the tubulation tubing may be carried out by attaching the adhesive member to the flange of the tubulation tubing and then heating them in an oven at about 380 to 390° C., at which the adhesive member softens, for 10 to 30 minutes, thereby bonding by fusing the adhesive member to the flange of the tubulation tubing. It is preferable to produce a number of tubulation tubings with the adhesive members bonded thereto beforehand by a process separate from the process of assembling display panels.

The auxiliary pressure member is an auxiliary member for pressing the adhesive member and the flange of the tubulation tubing attached to the adhesive member toward the display panel. The auxiliary pressure member may be formed of any kind of material that has a higher softening point than that of the adhesive member and has a thermal expansion coefficient substantially the same as that of the adhesive member for preventing cracks. However, since the tubulation tubing is typically bonded simultaneously when the display panel is sealed, the auxiliary pressure member preferably has a softening point not lower than the sealing temperature.

Preferably, the auxiliary pressure member has a non-oxidizable property. If the tubulation tubing is bonded in the sealing step, a protective layer for a terminal section of the display panel is removed after the sealing step. In this removal step, the terminal section of the display panel is immersed in nitric acid for removing an anti-oxidant paste in the terminal section. For protecting the adhesive member in the removal step, the auxiliary pressure member preferably has the non-oxidizable property.

Accordingly, the auxiliary pressure member is preferably formed of a glass material having a softening point not lower than 500° C. As an example of such material, a lower softening point glass containing $Na_2O—B_2O_3$ may be mentioned. In addition, ceramics and the like may be used.

For example, as a material for the auxiliary pressure member, a low softening point glass frit containing $Na_2O$, $Al_2O_3$, $B_2O_3$ and $SiO_2$ which has a softening point of 500° C. or higher and a thermal expansion coefficient of $72.5\pm5\times10^{-7}/°C$., which is the same as that of the adhesive member, may be used, and a binder resin known in the field such as acrylic resin, methacrylic resin, cellulose resin and the like may be added to the low softening point glass frit. This material may be press-molded in a doughnut shape having a substantially rectangular section, and then baked. Preferably, the auxiliary pressure member is baked.

The provisional fixation of the auxiliary pressure member and the adhesive member to the tubulation tubing may be carried out by attaching the tubulation tubing to a jig with the flange positioned on the top, sequentially mounting the auxiliary pressure member and the adhesive member on the flange of the tubulation tubing, and then heating them in an oven at about 380 to 390° C., at which the adhesive member softens, for 10 to 30 minutes, thereby bonding by fusing the adhesive member to the flange of the tubulation tubing and the auxiliary pressure member.

The thus prepared tubulation tubing is placed on the display panel having a vent hole so that the end face of the flange of the tubulation tubing is contacted with the display panel and the vent hole is covered with the opening of the tubulation tubing. At this time, since the end face of the flange is substantially flat, it is easy to contact and hold it to the display panel.

Thereafter, the tubulation tubing is held by pressing the flange of the tubulation tubing or the auxiliary pressure member toward the display panel face by means of the pressing tool. Then the flange of the tubulation tubing is bonded to the display panel by fusion of the adhesive member by heating to the temperature at which the adhesive member softens. Any kind of tool can be used as the pressing tool, but a clip is typically used.

The temperature at which the adhesive member softens is 390 to 400° C. as described above. However, in the case where the tubulation tubing is bonded simultaneously with the sealing step, the temperature may be raised to about 400 to 410° C. In this case, heating to the softening temperature or higher does not cause troubles, because the adhesive member has a high viscosity.

Desirably, the thickness of the auxiliary pressure member is smaller than that of the flange in a longitudinal direction of the tubulation tubing. Also desirably, the total thickness of the adhesive member and the auxiliary pressure member is larger than that of the flange in the longitudinal direction of the tubulation tubing. With this setting of the thickness of the adhesive member and the auxiliary pressure member, the flange of the tubulation tubing stops the movement of the auxiliary pressure member, for example, by a clip, in a pressing direction when heated at the temperature at which the adhesive member softens. This can prevent excessive pressure on the adhesive member.

The present invention also provides a method of bonding a tubulation tubing of a display panel comprising the steps of: preparing a tubular tubulation tubing, a ring-shape adhesive member and a ring-shape auxiliary pressure member which are to be fitted to the perimeter of one end of the tubulation tubing, the ring-shape auxiliary pressure member having a higher softening point than that of the adhesive member; placing the tubulation tubing on a display panel having a vent hole in such a manner that said one end of the tubulation tubing contacts the display panel and the vent hole is covered with an opening of the tubulation tubing, with the adhesive member and the auxiliary pressure member being fitted to the tubulation tubing so that the adhesive member is situated on a display panel side; and holding the tubulation tubing by pressing the auxiliary pressure member toward the display panel with use of a pressing tool and heating to a temperature at which only the adhesive member softens, thereby bonding an end face at said one end of the tubulation tubing to the display panel by fusion of the adhesive member.

According to the present invention, prepared are the ring-shape adhesive member and the auxiliary pressure member having a higher softening point than the adhesive member, which are fitted to the perimeter of one end of the tubulation tubing. The adhesive member and the auxiliary pressure member are fitted to the tubulation tubing so that the adhesive member is located on a display panel side. The tubulation tubing is held by pressing the auxiliary pressure member toward the display panel with use of the pressing tool. Therefore, the pressing tool does not contact the adhesive member directly, which prevents the adhesive member such as glass from adhering to the pressing tool, for example, a clip.

Further, the tubulation tubing is placed on the display panel with one end of the tubulation tubing contacted with the display panel and also the adhesive member and the auxiliary pressure member are fitted to the perimeter of said one end of the tubulation tubing. The tubulation tubing is held by pressing the auxiliary pressure member toward the display panel with use of the pressing tool. Therefore, the melted adhesive member does not enter the inside of the tubulation tubing. Also, since the pressing force by the clip can be strengthened, the inclination of the tubulation tubing by external force can be suppressed.

The present invention also relates to a tubulation adhesion structure in which a flange of a tubulation tubing is bonded to a display panel by the above-described method.

The present invention further provides a tubulation assembly to be connected to a vent hole of a display panel for venting gas out of the inside of the panel. The tubulation assembly includes a hollow tubulation tubing having, at one end, an opening for communicating with the vent hole of the display panel and a flange with a substantially flat end face for contact with the display panel; a ring-shape adhesive member of a glass frit integrally fitted to the perimeter of the flange of the tubulation tubing; and a ring-shape auxiliary pressure member integrally fitted to the perimeter of the flange of the tubulation tubing so as to cover the adhesive member, the auxiliary pressure member having a higher softening point than that of the adhesive member.

The present invention is now explained in further detail by way of examples with reference to the attached drawings. These examples, however, should not be construed to limit the scope of the invention.

EXAMPLE 1

FIGS. 1 to 5 illustrate Example 1 of the method of bonding a tubulation tubing of a display panel according to the present invention.

In this example, as shown in FIG. 1, a cylindrical tubulation tubing 1 has a flange 2 with a substantially flat end face 2a, at an opening at one end of the tubulation tubing (gas conduit tube) 1. A ring-shape adhesive member 3 is provisionally bonded to the perimeter of the flange 2 of the tubulation tubing 1. Thus a tubulation assembly 4 with the adhesive member is produced beforehand.

The tubulation tubing 1 is a cylindrical pipe made of a typical soda lime glass (having a softening point of 500 to 700° C.). The adhesive member 3 is a molded glass member produced by blending a binder resin with a low softening point glass frit, followed by molding and baking.

In this example, for the adhesive member 3, used is a low softening point glass frit containing PbO, $SiO_2$, $Al_2O_3$, $B_2O_3$ and LiO and having a softening point of about 390° C. and a thermal expansion coefficient of $72.5 \pm 5 \times 10^{-7}/°C.$, to which a binder resin known in the field of art such as an acrylic resin, methacrylic resin, cellulose resin or the like is added. This glass frit is press-molded into a doughnut shape having a substantially rectangular section and attached to the flange 2 of the tubulation tubing 1, which is then placed in a heating oven and heated at about 380 to 390° C., at which the adhesive member 3 softens, for about 10 to 30 minutes. Thus the adhesive member 3 is bonded to the flange 2 of the tubulation tubing 1. Tubulation assemblies 4 are produced beforehand in a large number by a process independent of the process of assembling display panels.

Figure 2:
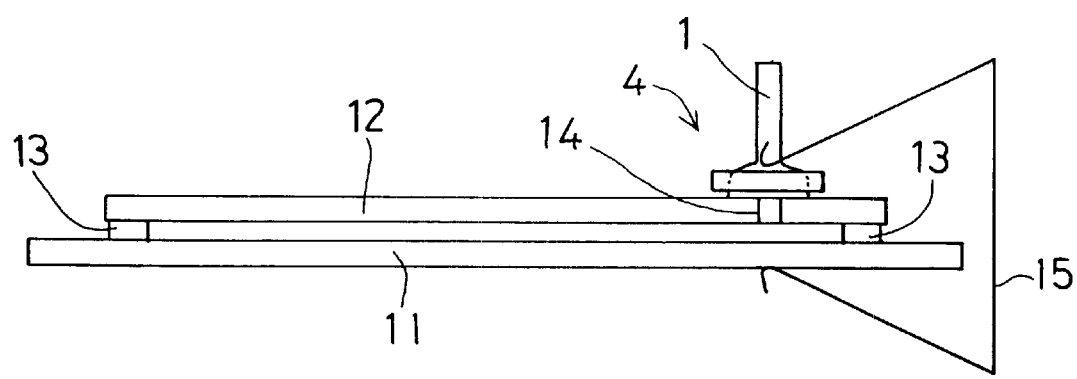
FIG. 2 illustrates a state in which a tubulation assembly is placed at the position of a vent hole on a back substrate in the production of a display panel in accordance with Example 1.

Subsequently, as shown in FIG. 2, when the perimeter of a front substrate 11 and a back substrate 12 is sealed with a sealing member 13 containing a lower softening point glass as a main ingredient in the process of producing the display panel, the tubulation assembly 4 is positioned at a vent hole 14 on the back substrate 12. At this time, the tubulation assembly 4 is so positioned that the end face 2a of the flange 2 of the tubulation tubing 1 contacts the back substrate 12 and the vent hole 14 is covered with the opening of the tubulation tubing 1.

After this positioning, the tubulation tubing 1 and the display panel are clamped with a clip 15 so that the tubulation tubing is held in such a manner that the flange 2 of the tubulation tubing 1 is pressed against the display panel. At this pressing, the display panel is clamped at several sites on its periphery with similar clips.

Figure 3:
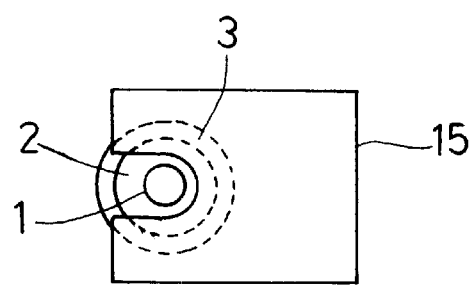
FIG. 3 is a plan view illustrating a state in which the tubulation tubing and the display panel are clamped by a clip in Example 1.

FIG. 3 is a plan view illustrating a state in which the tubulation tubing 1 and the display panel are clamped with the clip 15. As shown in this figure, the clip 15 is provided with a notch so that the flange 2 of the tubulation tubing 1 can be pressed.

Next, while maintaining this state in which the tubulation tubing 1 and the display panel are clamped with the clip 15, the sealing of the display panel and the gas exhaustion of the display panel are carried out. In these sealing and gas exhaustion steps, the display panel is placed in a sealing and gas exhaustion oven. The display panel is baked at a temperature of 400 to 410° C., at which the sealing member 13 softens, to soften the sealing member 13 at the perimeter of the display panel and seal the front substrate 11 and the back substrate 12. Since the tubulation tubing 2, the front substrate 11 and the back substrate 12 are made of soda lime glass, which has a softening point of about 500 to 700° C., they are not softened at this baking temperature.

The adhesive member 3, heated in this step, softens, so that the flange 2 of the tubulation tubing 1 is bonded to the back substrate 12 by fusion of the adhesive member 3.

In this state, where the front substrate 11 and the back substrate 12 are sealed and the tubulation tubing 1 is also bonded to the back substrate 12, an impurity gas inside the panel is vented out via the tubulation tubing 1, and in turn the discharge gas is filled inside the panel. Thereafter, the tubulation tubing 1 is cut by melting so that the gas path in the tubulation tubing 1 is closed, and thereby the discharge space is shut tightly.

Figure 4:
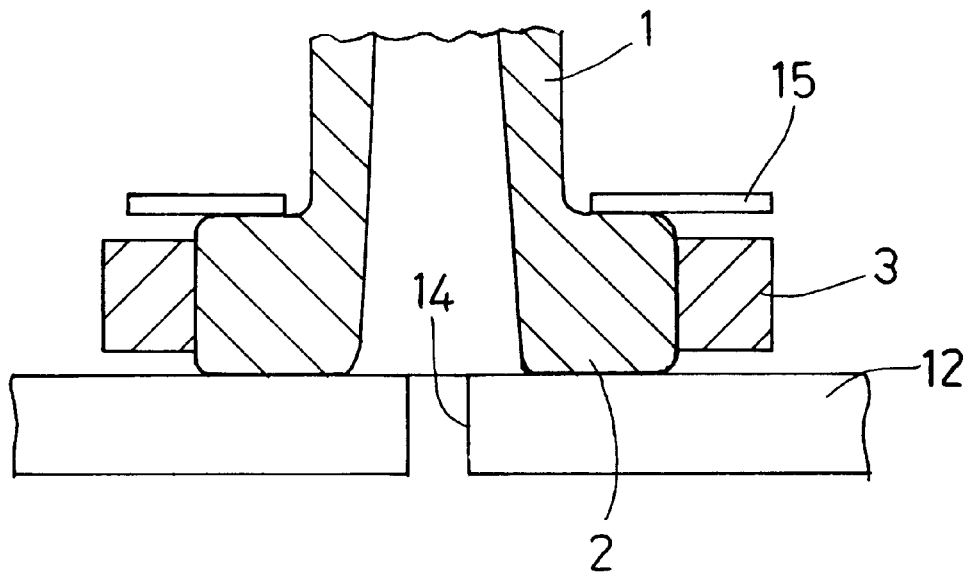
FIG. 4 is a sectional view illustrating the vicinity of a flange of the tubulation tubing before a sealing step in Example 1.
Figure 5:
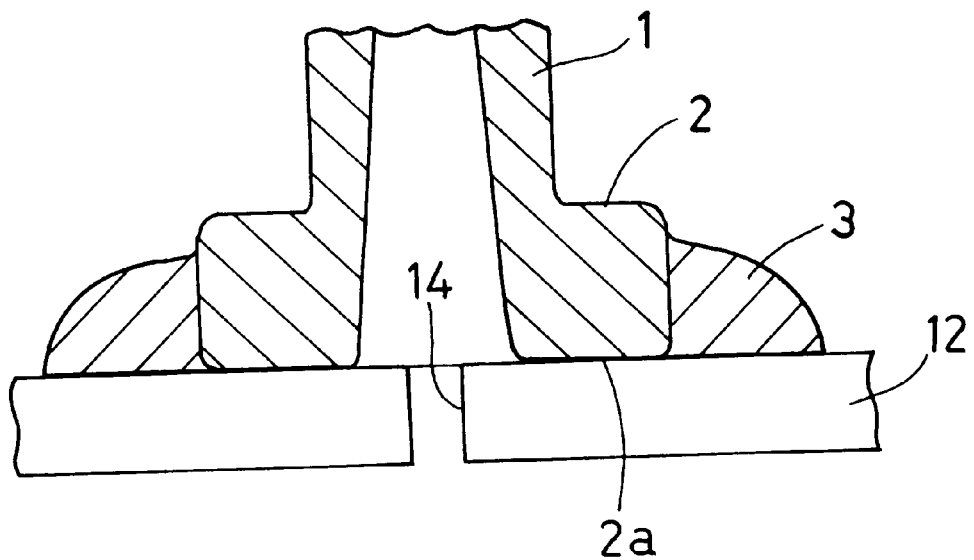
FIG. 5 is a sectional view illustrating the vicinity of the flange of the tubulation tubing after the sealing step in Example 1.

FIGS. 4 and 5 are sectional views illustrating the vicinity of the flange 2 of the tubulation tubing 1, FIG. 4 showing a state before the sealing step and FIG. 5 showing a state after the sealing step.

Before the sealing step, as shown in FIG. 4, the flange 2 of the tubulation tubing 1 is pressed by the clip 15, and after the sealing step, as shown in FIG. 5, the flange 2 of the tubulation tubing 1 is bonded to the back substrate 12 by fusion of the softened adhesive member 3. Accordingly, even if a small gap exists between the end face 2a of the flange 2 and the back substrate 12, the gap can be positively filled up with the softened adhesive member 3.

Thus, in this example, the tubulation assembly 4 with the ring-shape adhesive member 3 provisionally attached to the perimeter of the flange 2 of the tubulation tubing 1 is produced beforehand. The tubulation tubing 1 is bonded to the display panel via the flange 2 using the tubulation assembly 4. Therefore, setting can be done by positioning the tubulation tubing 1 and the display panel alone, which facilitates the automatization of production of display panels.

Also, since the tubulation tubing 1 is held by pressing the flange 2 of the tubulation tubing 1 against the display panel with the clip 15, the clip 15 does not contact the adhesive member 3 directly, which prevents the adhesive member 3 from adhering to the clip 15.

Further, since the tubulation assembly 4 is located on the display panel with the end face 2a of the flange 2 of the tubulation tubing 1 contacting the back substrate 12 and the tubulation tubing 1 is fixed by pressing the flange 2 of the tubulation tubing 1 against the display panel with the clip 15, the melted adhesive member 3 does not enter the tubulation tubing 1 even if the pressing force of the clip 15 is strengthened. Therefore, it is possible to increase the pressing force by the clip 15 and prevent the inclination of the tubulation tubing 1 by external force.

EXAMPLE 2

FIGS. 6(a) to 6(c) and FIGS. 7 to 9 illustrate Example 2 of the method of bonding a tubulation tubing of a display panel according to the present invention.

Figure 6A:
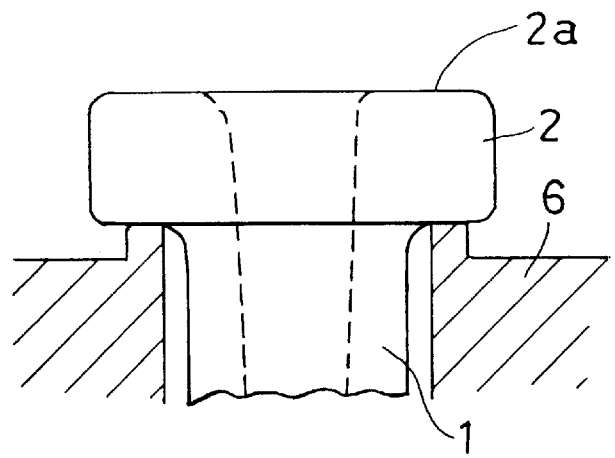
FIGS. 6(a) to 6(c) illustrate Example 2 of the method for bonding a tubulation tubing of a display panel in accordance with the present invention.
Figure 6B:
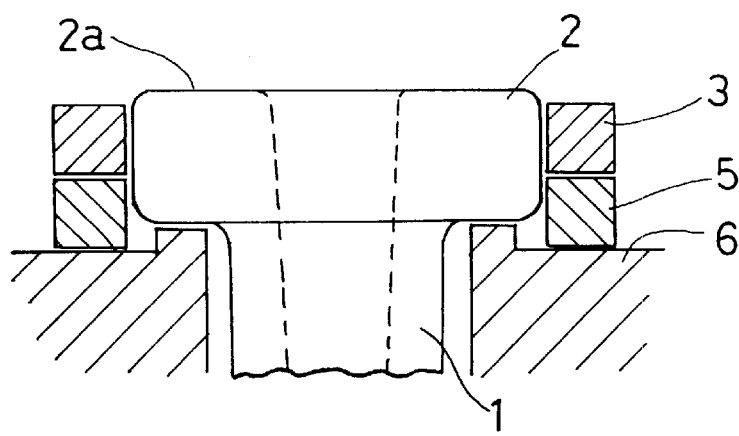
Figure 6C:
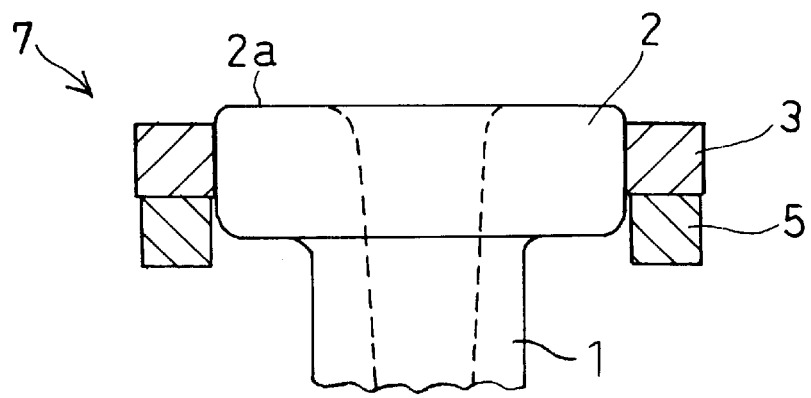

First, as shown in FIGS. 6(a) to 6(c), used is a cylindrical tubulation tubing 1 having, at an opening at one end, a flange 2 with a substantially flat end face 2a. A ring-shape adhesive member 3 and a ring-shape auxiliary pressure member 5 having a higher softening point than the adhesive member 3 are provisionally bonded to the perimeter of the flange 2 of the tubulation tubing 1 in this order from said one end. Thus a tubulation tubing assembly 7 with the members is produced beforehand.

In this example, the adhesive member 3 is the same as that in Example 1. The auxiliary pressure member 5 is formed of a low softening point glass frit containing $Na_2O$, $Al_2O_3$, $B_2O_3$ and $SiO_2$ and having a softening point of about 500° C. and the same thermal expansion coefficient of $72.5 \pm 5 \times 10^{-7}/°C.$ as that of the adhesive member 3, to which a binder resin known in the field of art such as an acrylic resin, methacrylic resin, cellulose resin or the like is added. This glass frit is press-molded into a doughnut shape having a substantially rectangular section.

The tubulation assembly 7 is produced by first setting the tubulation tubing 1 to a jig 6 with the flange 2 positioned on the top (see FIG. 6(a); subsequently setting the ring-shape auxiliary pressure member 5 on the perimeter of the flange 2 by placing the member 5 on the jig 6; and thereafter setting the adhesive member 3 thereon (see FIG. 6(b)). With this state kept, the tubulation tubing 1 together with the members 3, 5 and jig 6 is put in a heating oven and heated to soften the adhesive member 3, so that the adhesive member 3 is bonded to the perimeter of the flange 2 and the auxiliary pressure member 5 is bonded to the adhesive member 3 (see FIG. 6(c)).

As shown in these figures, the thickness of the auxiliary pressure member 5 is smaller than that of the flange 2 in the longitudinal direction of the tubulation tubing 1. The total thickness of the adhesive member 3 and the auxiliary pressure member 5 is larger than that of the flange in the longitudinal direction of the tubulation tubing 1.

In the heating oven, heating is performed at about 380 to 390° C., at which the adhesive member 3 softens, for about 10 to 30 minutes as in Example 1. Thus, the adhesive member 3 is bonded by fusing to the flange 2 of the tubulation tubing 1 and the auxiliary pressure member 5. Tubulation assemblies 7 are produced beforehand in a large number by a process independent of the process of producing the display panels.

Figure 7:
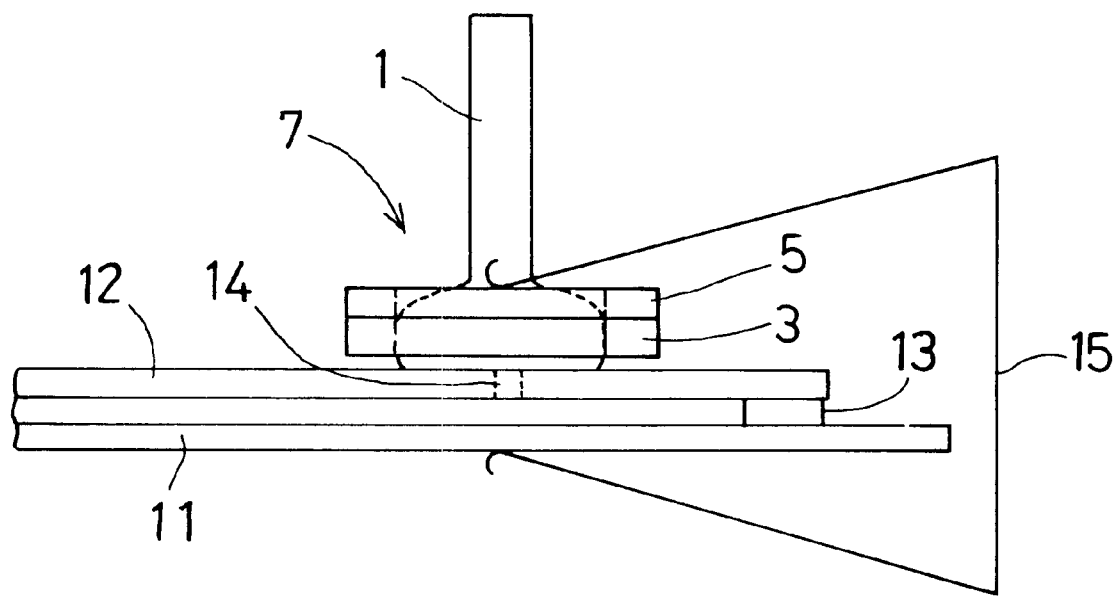
FIG. 7 illustrates a state in which a tubulation assembly is placed at the position of a vent hole on a back substrate in the production of a display panel in accordance with Example 2.

Subsequently, as shown in FIG. 7 and as in Example 1, when the perimeter of a front substrate 11 and a back substrate 12 is sealed with a sealing member 13 containing a lower softening point glass as a main ingredient in the process of producing the display panel, the tubulation assembly 7 is positioned at a vent hole 14 on the back substrate 12. At this time, the tubulation assembly 4 is so positioned that the end face 2a of the flange 2 of the tubulation tubing 1 contacts the back substrate 12 and the vent hole 14 is covered with the opening of the tubulation tubing 1.

After this positioning, the auxiliary pressure member 5 and the display panel are clamped with a clip 15 so that the tubulation tubing is held in such a manner that the adhesive member 3 and the flange 2 of the tubulation tubing 1 bonded to the adhesive member 3 are pressed toward the display panel. At this pressing, the display panel is clamped at several sites on its periphery with similar clips. The clip 15 is provided with a notch similar to that mentioned in Example 1, to allow the auxiliary pressure member 5 to be pressed.

Next, while maintaining this state in which the auxiliary pressure member 5 and the display panel are clamped with the clip 15, the sealing of the display panel and the gas exhaustion of the display panel are carried out. These sealing and gas exhaustion steps are done at the same temperature for the same period of time as described in Example 1.

The adhesive member 3, heated in this step, is softened, so that the flange 2 of the tubulation tubing 1 is bonded to the back substrate 12 by fusion of the adhesive member 3. In this state kept, the impurity gas inside the panel is vented out, and in turn the discharge gas is filled inside the panel, via the tubulation tubing 1. Thereafter, the tubulation tubing 1 is cut by melting so that the gas path in the tubulation tubing 1 is blocked, and thereby the discharge space is shut tightly.

Figure 8:
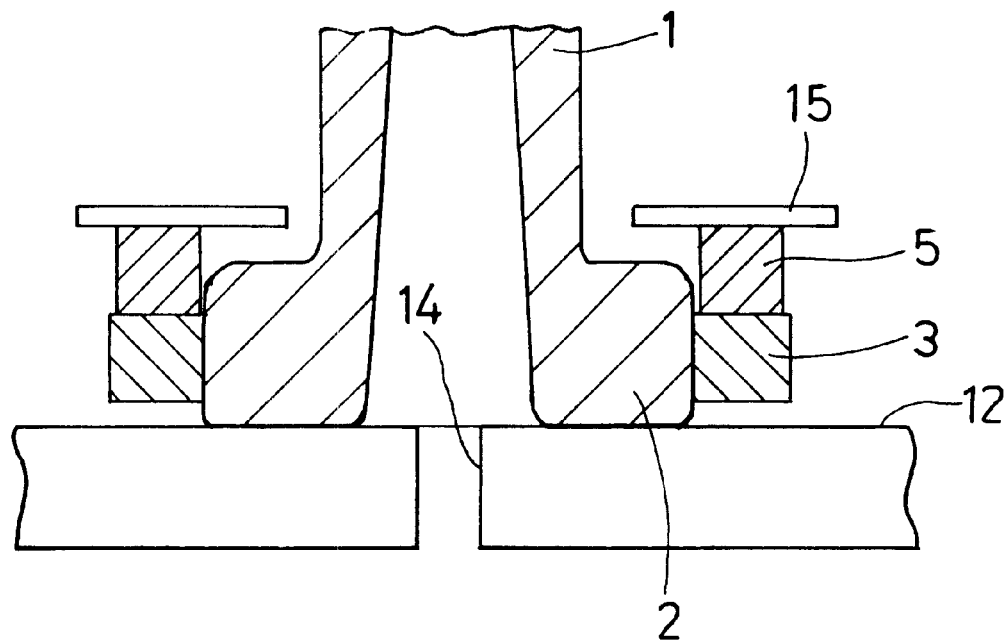
FIG. 8 is a sectional view illustrating the vicinity of a flange of the tubulation tubing before a sealing step in Example 2.
Figure 9:
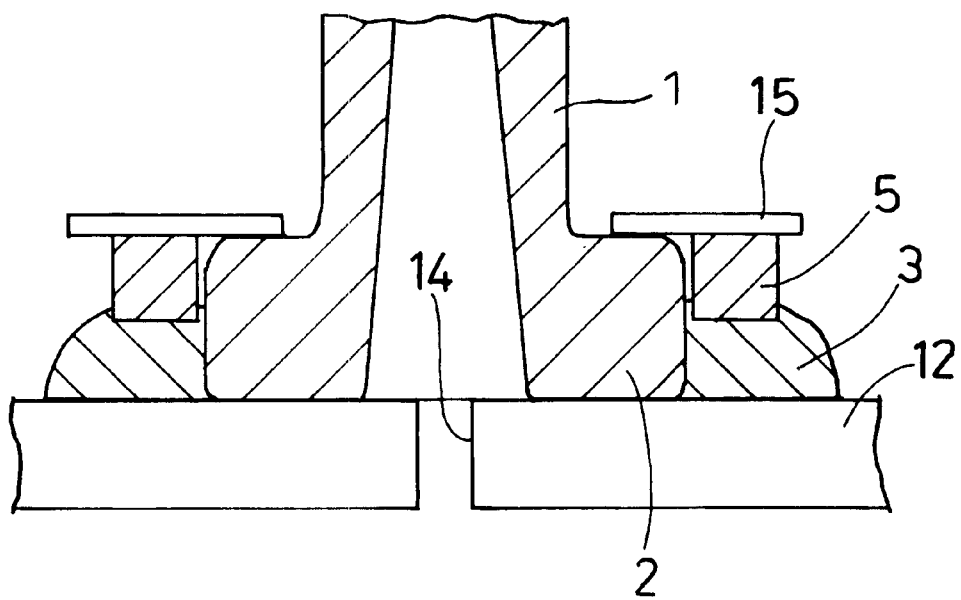
FIG. 9 is a sectional view illustrating the vicinity of the flange of the tubulation tubing after the sealing step in Example 2.

FIGS. 8 and 9 are sectional views illustrating the vicinity of the flange 2 of the tubulation tubing 1, FIG. 8 showing a state before the sealing step and FIG. 9 showing a state after the sealing step.

Before the sealing step, as shown in FIG. 8, the auxiliary pressure member 5 is pressed by the clip 15, and after the sealing step, as shown in FIG. 9, the flange 2 of the tubulation tubing 1 is bonded to the back substrate 12 by fusion of the softened adhesive member 3.

As described above, the thickness of the auxiliary pressure member 5 is smaller than that of the flange 2 in the longitudinal direction of the tubulation tubing 1. The total thickness of the adhesive member 3 and the auxiliary pressure member 5 is larger than that of the flange 2 in the longitudinal direction of the tubulation tubing 1. Therefore, when the adhesive member 3 softens, the movement of the auxiliary pressure member 5 by the clip 15 in the pressing direction is stopped by the flange 2 of the tubulation tubing 1, so that the adhesive member 3 is not pressed.

After the inside of the panel is purged of the impurity gas and filled with the discharge gas via the tubulation tubing 1, the protecting layer for terminals is usually removed. Before the sealing and gas-exhaustion steps, the surface of the terminals lead out in a peripheral region of the display panel has been coated with an anti-oxidation paste containing fine particles of zinc oxide for preventing the oxidization of the terminals. At this step, this anti-oxidation paste on the terminals is removed.

Figure 10:
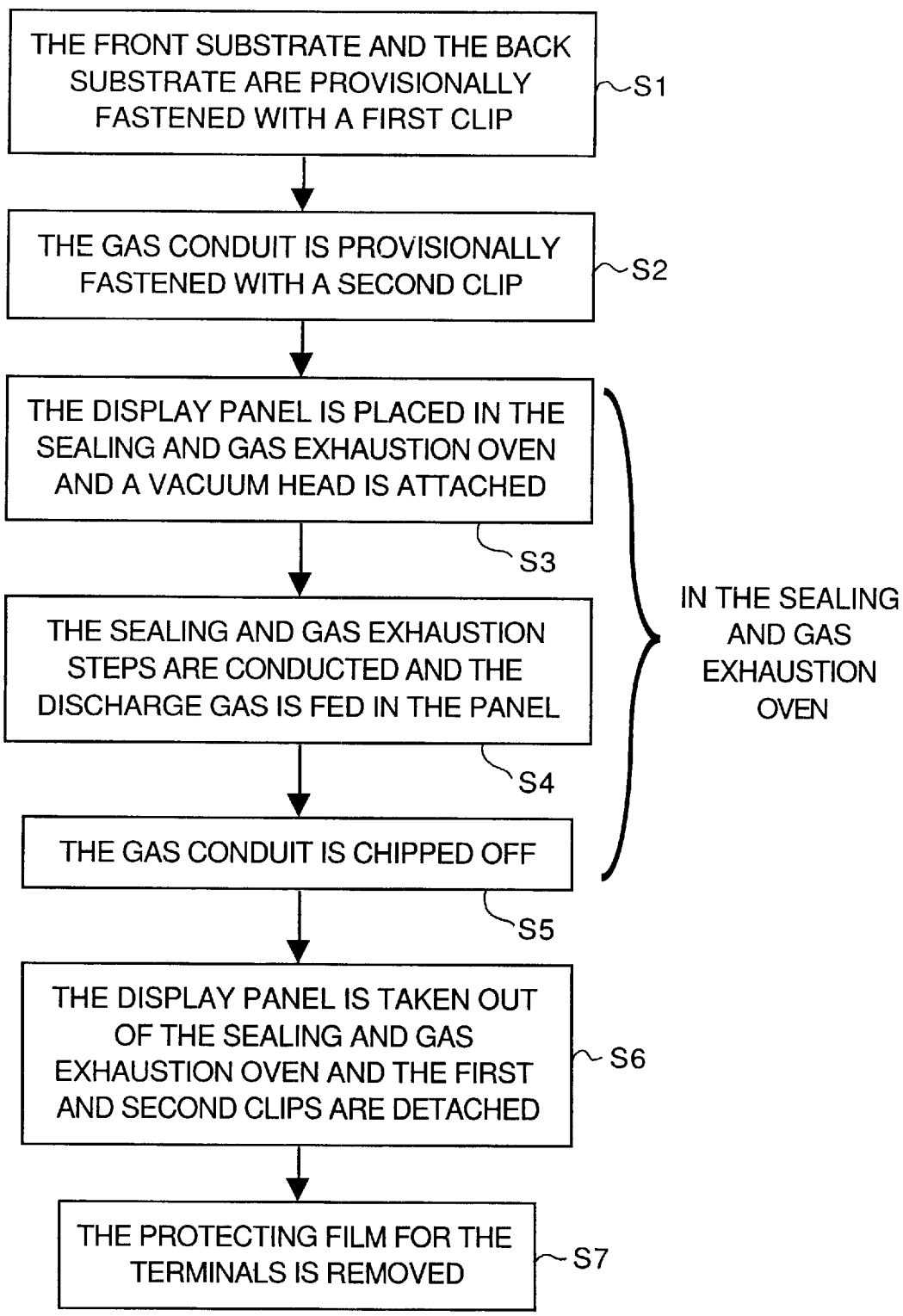
FIG. 10 is a flowchart showing sealing and gas venting processes in the Examples.
Figure 11:
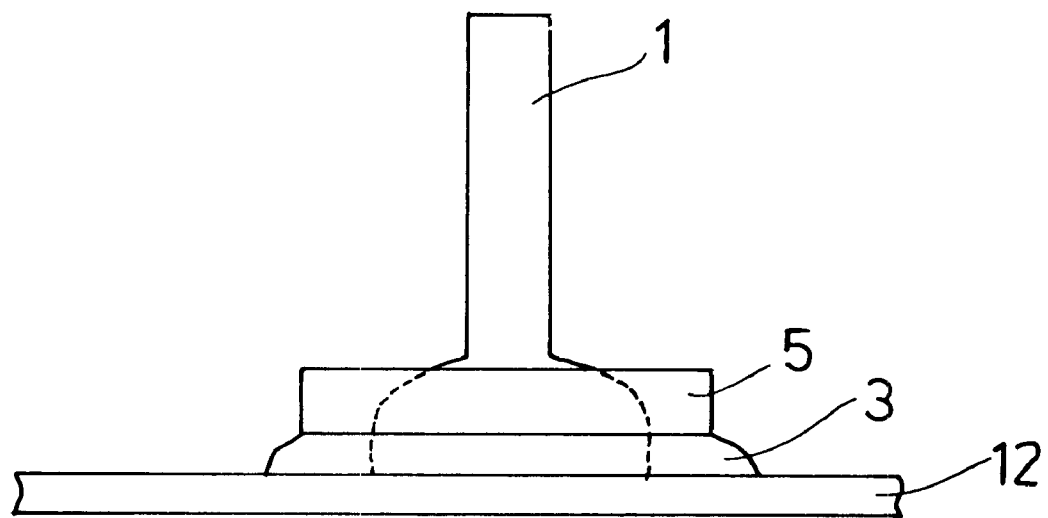
FIG. 11 illustrates an example according to Example 2 in which an auxiliary pressure member reduces the etching of an adhesive member by an acid to a minimum in Example 2.

The above-mentioned sealing and gas exhaustion steps are explained with reference to the flowchart shown in FIG. 10.

First, the front substrate 11 and the back substrate 12 are provisionally fastened with a first clip in step S1; the tubulation tubing 1 is provisionally fastened with a second clip in step S2; subsequently, the display panel is placed in the sealing and gas exhaustion oven and a vacuum head is attached to the tubulation tubing 1 in step S3; the sealing and gas exhaustion steps are conducted and the discharge gas is fed in the panel in step S4; the tubulation tubing 1 is chipped off in step S5; the display panel is taken out of the sealing and gas exhaustion oven and the first and second clips are detached in step S6; and the protecting film for the terminals is removed in step S7.

Thus, in this example, the tubulation assemblies 7 are produced beforehand, in which the ring-shape adhesive member 3 and the auxiliary pressure member 5 are provisionally bonded to the perimeter of the flange 2 of the tubulation tubing 1. Since the flange 2 of the tubulation tubing 1 is bonded to the display panel using this tubulation assembly 7, the setting can be done only by positioning the two elements, i.e., the tubulation tubing 1 and the display panel. Accordingly, the automatization is facilitated.

Also, since the tubulation tubing is fastened by pressing the auxiliary pressure member 5 toward the display panel with use of the clip 15, the clip 15 does not contact the adhesive member 3 directly and therefore, the adhesive member 3 is prevented from adhering to the clip 15.

Further, the tubulation assembly 7 is disposed with the end face 2a of the flange 2 of the tubulation tubing 1 contacted with the back substrate, and the tubulation tubing 1 is held by pressing the auxiliary pressure member 5 toward the display panel with use of the clip 15. Therefore, even if the pressing force of the clip 15 is strengthened, the melted adhesive member 3 does not enter the inside of the tubulation tubing 1. The inclination of the tubulation tubing 1 owing to external force can be controlled by strengthening the pressing force of the clip 15.

Besides, in the step of removing the protecting layer for the terminals, in which the anti-oxidation paste on the terminals is removed by immersing the terminals of the display panel in nitric acid, the auxiliary pressure member 5 formed of the glass material which is acid resistant exists on the adhesive member 3. Therefore, the adhesive member 3 underlies the auxiliary pressure member 5, and contacts nitric acid in only a small surface area, which can suppress the etching of the adhesive member 3 by the acid to a minimum.

According to the present invention, prepared are the tubulation tubing having, at one end, the flange with a substantially flat end face and the ring-shape adhesive member to be attached to the periphery of the flange of the tubulation tubing. The tubulation tubing and the adhesive member are placed on the display panel so that the vent hole of the display panel communicates with the opening of the tubulation tubing. The flange of the tubulation tubing is pressed against the display panel face with use of the pressing tool, and the tubulation tubing is bonded by heating to a temperature at which the adhesive member softens. Accordingly, even if the adhesive member is formed of glass, for example, the adhesive member can be prevented from entering the tubulation tubing and adhering to the clip.

What is claimed is:

1. A method of bonding a tubulation tubing of a display panel comprising the steps of:
   preparing a tubular tubulation tubing having, at one end, a flange with a substantially flat end face and a ring-shape adhesive member provisionally fixed to only the perimeter of the flange of the tubulation tubing;
   placing the tubulation tubing, with the adhesive member thereon, on a display panel having a vent hole in such a manner that the end face of the flange of the tubulation tubing contacts the display panel and the vent hole is covered with an opening of the tubulation tubing; and
   holding the tubulation tubing by pressing the flange of the tubulation tubing to the display panel with a pressing tool; and
   heating to a temperature at which the adhesive member softens, thereby bonding the flange of the tubulation tubing to the display panel by fusion of the adhesive member.

2. A method of bonding a tubulation tubing of a display panel comprising the steps of:
   preparing a tubular tubulation tubing having a substantially flat end with a periphery immediately adjacent thereto, an adhesive member and an auxiliary pressure member having a higher softening point than that of the adhesive member;
   placing the tubulation tubing on a substantially flat surface of a display panel having a vent hole, with the adhesive member and the auxiliary pressure member on a perimeter of the flat end of the tubing, in such a manner that the flat end of the tubing contacts the substantially flat surface of the display panel, the vent hole is covered with an opening of the tubulation tubing, one face of the adhesive member is situated on the flat surface of the display panel, and the auxiliary pressure member is positioned on an opposite face of the adhesive member; and
   holding the tubulation tubing by pressing the auxiliary pressure member toward the display panel with a pressing tool; and
   heating to a temperature at which only the adhesive member softens, thereby bonding the tubulation tubing to the flat surface of the display panel by fusion of the adhesive member.

3. The method according to claim 2, wherein the tubulation tubing flat end includes a flange with a substantially flat end face, and prior to the placing step, the adhesive member and the auxiliary pressure member are provisionally fixed on the perimeter of the flange of the tubulation tubing.

4. The method according to claim 2, wherein the adhesive member is a formed glass member prepared by mixing a binder with a low softening point glass frit, forming the glass frit and baking the formed glass frit.

5. The method according to claim 4, wherein the auxiliary pressure member is a formed glass member prepared by mixing a binder with a low softening point glass frit, forming the glass frit and baking the formed glass frit.

6. The method according to claim 5, wherein the low softening point glass frit used for the auxiliary pressure member has a higher softening point than that of the low softening point glass frit used for the adhesive member.

7. The method according to claim 5, wherein a temperature at which only the adhesive member softens is not lower than the softening point of the low softening point glass frit used for the adhesive member and not higher than the softening point of the low softening point glass frit used for the auxiliary pressure member.

8. The method according to claim 3, wherein the provisional fixation of the adhesive member and the auxiliary pressure member to the tubulation tubing comprises provisionally fastening the adhesive member and the auxiliary pressure member to the perimeter of the flange at said flat end of the tubulation tubing, and heating the adhesive member and the auxiliary pressure member to a temperature at which only the adhesive member softens, thereby bonding the adhesive member to the flange of the tubulation tubing and to the auxiliary pressure member by fusing.

9. The method according to claim 1, wherein the pressing tool comprises a clip.

10. The method according to claim 2, wherein the flat end is a flange with a substantially flat end face, and a thickness of the auxiliary pressure member is smaller than a thickness of the flange in a longitudinal direction of the tubulation tubing.

11. The method according to claim 2, wherein the flat end is a flange with a substantially flat end face, and a total thickness of the adhesive member and the auxiliary pressure member is larger than a thickness of the flange in a longitudinal direction of the tubulation tubing.

12. The method according to claim 2, wherein the flat end is a flange with a substantially flat end face, and at the heating step, movement of the auxiliary pressure member in a pressing direction by the clip is stopped by the flange of the tubulation tubing.

13. The method according to claim 2, wherein the auxiliary pressure member has a non-oxidizable property.

14. A tubulation adhesion structure of a display panel comprising a display panel to which the flange of the tubulation tubing is bonded by a method as set forth in of claim 1.

15. A method of bonding a tubulation tubing of a display panel comprising the steps of:
   preparing a tubular tubulation tubing, a ring-shape adhesive member and a ring-shape auxiliary pressure member which are connected to a perimeter of a flange at one end of the tubulation tubing, the ring-shape auxiliary pressure member having a higher softening point than that of the adhesive member;
   placing the tubulation tubing, with the adhesive member and the connected auxiliary pressure member to a perimeter of the flange, on a display panel having a vent hole in such a manner that said one end of the tubulation tubing contacts the display panel and the vent hole is covered with an opening of the tubulation tubing, with the adhesive member being situated on a display panel side; and holding the tubulation tubing by pressing the auxiliary pressure member toward the display panel with use of a pressing tool, and heating to a temperature at which only the adhesive member softens, thereby bonding an end face at said one end of the tubulation tubing to the display panel by fusion of the adhesive member, wherein a thickness of the auxiliary pressure member is smaller than a thickness of the flange in a longitudinal direction of the tubulation tubing.

16. A method of bonding a tubulation tubing of a display panel comprising the steps of:

preparing a tubular tubulation tubing, a ring-shape adhesive member and a ring-shape auxiliary pressure member which are connected to a perimeter of flange at one end of the tubulation tubing, the ring-shape auxiliary pressure member having a higher softening point than that of the adhesive member;

placing the tubulation tubing, with the adhesive member and the auxiliary pressure member connected to a perimeter of the flange on a display panel having a vent hole in such a manner that said one end of the tubulation tubing contacts the display panel and the vent hole is covered with an opening of the tubulation tubing, with the adhesive member being situated on a display panel side; and holding the tubulation tubing by pressing the auxiliary pressure member toward the display panel with use of a pressing tool, and heating to a temperature at which only the adhesive member softens, thereby bonding an end face at said one end of the tubulation tubing to the display panel by fusion of the adhesive member;

wherein a total thickness of the adhesive member and the auxiliary pressure member is larger than a thickness of the flange in a longitudinal direction of the tubulation tubing.

17. A method of bonding a tubulation tubing of a display panel comprising the steps of:

preparing a tubular tubulation tubing, a ring-shape adhesive member and a ring-shape auxiliary pressure member which are connected to a perimeter of a flange at end of the tubulation tubing, the ring-shape auxiliary pressure member having a higher softening point than that of the adhesive member;

placing the tubulation tubing with the adhesive number and the auxiliary pressure member connected to a perimeter of the flange, on a display panel having a vent hole in such a manner that said one end of the tubulation tubing contacts the display panel and the vent hole is covered with an opening of the tubulation tubing, with the adhesive member being situated on a display panel side; and holding the tubulation tubing by pressing the auxiliary pressure member toward the display panel with use of a pressing tool, and heating to a temperature at which only the adhesive member softens, thereby bonding an end face at said one end of the tubulation tubing to the display panel by fusion of the adhesive member;

wherein, at the heating to the temperature at which only the adhesive member softens, movement of the auxiliary pressure member in a pressing direction by the clip is stopped by the flange of the tubulation tubing.

18. The method as recited in claim 2, wherein the adhesive ring member is formed to be ring shaped.

19. The method as recited in claim 2, wherein the adhesive member and the auxiliary pressure member are each formed to be ring shaped.

20. The method according to claim 1, wherein the adhesive member is a formed glass member prepared by a mixing a binder with a low softening point glass frit, forming the glass frit and baking the formed glass frit.

21. The method according to claim 2, wherein the pressing tool comprises a clip.

22. A tubulation adhesion structure of a display panel comprising a display panel comprising a display panel to which the tubulation tubing is bonded by a method as set forth in claim 2.

23. A tubulation adhesion structure of a display panel comprising a display panel to which the flange of the tubulation tubing is bonded by a method as set forth in claim 3.

24. The method according to claim 1, wherein the provisional fixation of the adhesive member to the tubulation tubing comprises provisionally fastening the adhesive member to the perimeter of the flange at said one end of the tubulation tubing, and heating the adhesive member to a temperature at which the adhesive member softens, thereby bonding the adhesive member to the flange of the tubulation tubing by fusing.

25. A method of bonding a tubulation tubing to a display panel by arranging a first end of the tubulation tubing at a periphery of a vent hole formed on the display panel and bonding the first end to the display panel, the method comprising the steps of:

fitting a ring-shaped glass frit that softens by being heated at a temperature, and a ring-shaped glass material that does not soften at the temperature, to the periphery of the first end of the tubulation tubing, with the glass frit situated on a display panel side; and heating the glass frit at the temperature while pressing the glass frit into the ring-shaped glass material, thereby bonding the first end of the tubulation tubing to the display panel by fusion of the glass frit.

26. The method according to claim 25, wherein the tubulation tubing has, at the first end, a flange with a substantially flat end face and a perimeter, and the glass frit and the glass material are provisionally fixed beforehand to the perimeter of the flange.

27. The method according to claim 25, wherein the glass frit and the glass material have substantially the same thermal expansion coefficient.

28. The method according to claim 26, wherein the glass frit and the glass material have substantially the same thermal expansion coefficient.

29. The method according to claim 25, wherein the glass material is acid-resistant.

30. The method according to claim 26, wherein the glass material is acid-resistant.

31. The method according to claim 27, wherein the glass material is acid-resistant.

32. The method according to claim 28, wherein the glass material is acid-resistant.

* * * * *

UNITED STATES PATENT AND TRADEMARK OFFICE
CERTIFICATE OF CORRECTION

PATENT NO.    : 6,591,635 B1
DATED         : July 15, 2003
INVENTOR(S)   : Akhiro Fujimoto et al.

It is certified that error appears in the above-identified patent and that said Letters Patent is hereby corrected as shown below:

Column 13,
Line 47, change "adhesive number" to -- adhesive member --.

Signed and Sealed this

Sixth Day of January, 2004

JAMES E. ROGAN
*Director of the United States Patent and Trademark Office*